United States Patent Office 3,520,696
Patented July 14, 1970

3,520,696
METHOD OF MAKING ALEURONE-CONTAINING PASTA
Robert Menzi, Geneva, Switzerland, assignor to Pates Alimentaires Rivoire & Carret, Marseille, France, a French company
No Drawing. Filed May 25, 1967, Ser. No. 641,144
Claims priority, application Switzerland, June 2, 1966, 8,009/66
Int. Cl. A23l 1/16
U.S. Cl. 99—85     10 Claims

ABSTRACT OF THE DISCLOSURE

Aleurone-containing pasta is made by peeling the husks off cereal grains, hydrating the peeled grains until they are soggy, agglomerating the soggy grains to form a paste which is then extruded to produce the desired pasta, the latter then being dried.

---

This invention relates to a method of making aleurone-containing pasta.

The conventional method currently used for making pasta consists in hydrating either wheat semolina or wheat flour by adding thereto 30% of water, energetically kneading this mixture to form a paste, subjecting the paste to extrusion to form the pasta and finally drying the thus extruded pasta.

This conventional method thus requires, as a starting substance, semolina or flour produced by grinding wheat grain. Wheat grains consist of an amyloid kernel having prismatic cells which contain the starch granules. This kernel, to which is attached the germ, is surrounded by a layer of cells, termed aleurone layer or protein layer. This layer is itself surrounded by several layers of cells which form the husk. In the course of grinding, the husks and the protein stratum separate from the amyloid kernel fragments by virtue of their different mechanical properties and different densities. The semolina that is finally obtained is made up of fragments of the amyloid kernel which are practically free of husk, germ and of aleurone layer. It therefore no longer contains the protein constituents and the vitamins which are contained in the germ and in the aleurone layer and which have a high nutritive value. The presence of the aleurone layer constituents in pasta is moreover of importance for the quality of cooked pasta, in particular as regards their elasticity and in obtaining a surface which does not stick.

Consequently, the currently used method of making pasta has the drawback of producing a pasta which is deprived of important constituents as regards their nutritive value and as regards their culinary quality. This is due to the fact that the starting substance is wheat semolina or wheat flour, i.e. that the wheat goes through a grinding operation, thereby causing losses in these constituents.

Another drawback of the currently used method lies in the difficulty of checking the nature of the starting ingredient at the stage of the semolina or of the wheat that is used.

An object of the invention is to provide a method of making pasta that enables the above drawbacks to be overcome.

The method provided by the present invention comprises removing the husks from cereal grains, hydrating the peeled grains to render them agglomeratable, agglomerating the hydrated grains to form a paste, extruding said paste to produce the pasta, and drying said pasta.

The method thus enables pasta to be prepared without going through a grinding operation, by starting directly from wheat grains. The pasta that is produced by this method has the same structure as pasta produced by the currently used conventional method, i.e. they have a continuous protein phase (gluten) in which the starch granules are dispersed. In any case, such a structure is not due to the fact that the grain goes through the semolina stage since it can also be observed in the amyloid kernel of the wheat grain. It would thus be pointless to subject the latter to a grinding operation since it already has the required structure.

The grain husks can be eliminated by any of the known methods, such as abrasion, whether in a dry state or in the presence of water, by steam processing or by the action of suitable reactants.

The peeled grains can be agglomedated by kneading or pressing after having been hydrated to the desired extent to render them plastic. Thus, by exerting very little mechanical stress on the gluten, its structure will be preserved.

Depending on the peeling method that is used, the grains are peeled to a more or less deep extent. In order to avoid excessive peeling which might affect the preservation of the germ and of the aleurone layer, use will preferably be made of a peeling method in an aqueous medium, in particular chemical peeling since the latter is highly selective and enables the germ and the aleurone layer to be preserved while enabling the husk to be eliminated. By way of a peeling agent, use can for instance be made of caustic soda or sulphuric acid.

Chemical peeling generally consists (see in Food Technology 1964, vol. 18, No. 8, page 40, the article by A. I. Morgan, E. J. Barta and P. W. Kilpatrick) of coating the grains with a solution of the reactant, for instance by spraying, leaving the reactant to act at a given temperature and for a given length of time, detaching the husks by rinsing, neutralizing and washing the peeled grains while hydrating them, and then drying them so that they have the desired water content.

The water content which yields the best results as regards agglomeration of the grains to form an extrudable paste, is from 30 to 45%. Such grains have a plastic consistency and are easily agglomeratable. To facilitate agglomeration, the grains can be coarsely chopped up or crushed. The extrusion of the paste that is obtained from these grains can be carried out in known manner, by known apparatus. The same applies to the drying of the resulting pasta.

To produce pasta having a highly homogeneous structure, it is necessary to subject the peeled grains to a more or less fine grinding operation before hydrating them for agglomeration and extrusion purposes. To carry out this grinding operation, the grains must be dry so that a drying operation must be effected after the grains have been hydrated during peeling.

The following examples will further illustrate the invention.

EXAMPLE 1

Peeled grains are prepared from hard wheat as follows: the grains are hydrated for about 1 hour in water at 20° C. After draining, the grains are coated with 20% caustic soda at 85° C. and stirred at this temperature for 5 minutes. They are then rinsed in water at 20° C., while being strongly agitated, for 7 minutes to thereby remove the husks, whereupon they are rinsed with an 0.5% hydrochloric acid solution at 20° C. for 5 minutes and then with water at 20° C. for 10 minutes. In order for the rains to have a suitable water content of 30 to 45%, they are left in water at 20° C. for 2 hours, whereupon they are dried or dained.

The grains are then coarsely crushed and kneaded to form a paste which is extruded by means of a press. The resulting pasta is then dried in the usual manner.

This pasta, once cooked, has an excellent elasticity and does not stick. Its nutritive value is higher than that of ordinary pasta since it contain the protein constituents of the germ and of the aleurone layer. It is thus of very great interest from the dietetic standpoint.

EXAMPLE 2

Peeled grains are prepared from soft wheat as follows: the grains are hydrated for 40 minutes in water at 20° C. After draining, the grains are coated with a 20% caustic soda solution at 85% C. and stirred at this temperature for 4 minutes. They are then rinsed, being strongly agitated, in water at 20° C. for 7 minutes, whereupon they are rinsed with an 0.5% hydrochloric acid solution at 20° C. for 10 minutes and then with water at 20° C. for 10 minutes. In order for the rain to have a suitable water content of 30 to 40%, it is further left in water at 20° C. for 45 minutes, whereupon they are drained or dried.

The grains are then coarsely crushed and kneaded to form a paste which is extruded by means of a press. The resulting pasta is then dried in the usual manner.

This pasta, once cooked, has a good elasticity and only sticks very little. It may be considered better than pasta prepared from flour of the same soft wheat by the conventional method.

EXAMPLE 3

The procedure is the same as in Example 1 up to the rinsing operation with water at 20° C. for 10 minutes. The peeled grain is then dried and ground. The resulting comminuted grain is then hydrated with water until its water content lies between 30 and 45%, whereupon it is coverted into paste which is then extruded by means of a press. The resultant pasta is then dried in the usual way.

This pasta has a highly homogeneous structure and has culinary and nutritive characteristics that are identical to those of the pasta produced in accordance with Example 1.

In the description of the method and in the examples, reference has always been made to grains of wheat and to pasta made from wheat because this cereal is traditionally used for his purpose, but it should be understood that the described method may also be applied to the manufacture of pasta from the grains of other cereals, such as rye, barley and rice. Clearly the peeling method will be chosen to suit the ceral.

I claim:
1. A method of making aleurone-containing pasta, which comprises removing the husks from cereal grains, hydrating the peeled grains to render them agglomeratable, agglomerating the hydrated grains to form a paste, extruding the paste to produce a pasta, and drying said pasta.

2. A method according to claim 1, wherein said grains are hydrated until their water content lies between 30 and 45%.

3. A method according to claim 2 which comprises coarsely chopping up the hydrated grains to facilitate agglomeration thereof.

4. A method according to claim 3, wherein the hydrated grains are agglomerated by kneading.

5. A method according to claim 2, wherein the hydrated grains are agglomerated by kneading.

6. A method according to claim 2, wherein the peeled grains are dried and ground before being hydrated.

7. A method according to claim 1 which comprises coarsely chopping up the hydrated grains to facilitate agglomeration thereof.

8. A method according to claim 7, wherein the hydrated grains are agglomerated by kneading.

9. A method according to claim 1, wherein the hydrated grains are agglomerated by kneading.

10. A method according to claim 1, wherein the peeled grains are dried and ground before being hydrated.

References Cited

UNITED STATES PATENTS

| 2,895,831 | 7/1959 | Zacharia | 99—85 XR |
| 3,264,113 | 8/1966 | Barta et al. | 99—80 |

LIONEL M. SHAPIRO, Primary Examiner

J. R. HOFFMAN, Assistant Examiner